US010901989B2

(12) United States Patent
Vernier et al.

(10) Patent No.: US 10,901,989 B2
(45) Date of Patent: Jan. 26, 2021

(54) DETERMINING SUBSTITUTE STATEMENTS

(71) Applicant: INTERNATIONAL BUSINESS MACHINES CORPORATION, Armonk, NY (US)

(72) Inventors: Stanley J. Vernier, Grove City, OH (US); Stephen A. Boxwell, Columbus, OH (US); Keith G. Frost, Delaware, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 15/920,984

(22) Filed: Mar. 14, 2018

(65) Prior Publication Data

US 2019/0286714 A1   Sep. 19, 2019

(51) Int. Cl.
*G06F 16/2452* (2019.01)
*G06F 16/2455* (2019.01)

(52) U.S. Cl.
CPC .... *G06F 16/24522* (2019.01); *G06F 16/2455* (2019.01)

(58) Field of Classification Search
CPC .............. G06F 16/2455; G06F 16/24522
USPC ........................................................ 707/769
See application file for complete search history.

(56) References Cited

U.S. PATENT DOCUMENTS

| 6,675,159 | B1 | 1/2004 | Lin et al. | |
| 7,912,842 | B1* | 3/2011 | Bayliss | G06F 16/215 707/749 |
| 9,230,009 | B2 | 1/2016 | Alkov et al. | |
| 9,275,115 | B2 | 3/2016 | Haggar et al. | |
| 9,424,494 | B1* | 8/2016 | Lineback | G06T 7/11 |
| 9,671,956 | B2* | 6/2017 | Kritt | G06F 16/3322 |
| 9,734,239 | B2* | 8/2017 | Allen | G06F 16/24578 |
| 9,767,159 | B2* | 9/2017 | Chen | G06F 16/24578 |
| 2007/0208727 | A1* | 9/2007 | Saklikar | G06F 16/28 |
| 2008/0133671 | A1* | 6/2008 | Kaleboukis | H04L 51/00 709/206 |

(Continued)

OTHER PUBLICATIONS

Beller, et al., "Watson Discovery Advisor: Question-answering in an Industrial Setting," Proceedings of 2016 NAACL Human-Computer Question Answering Workshop, San Diego, California, Jun. 12-17, 2016, pp. 1-7.

(Continued)

*Primary Examiner* — Shahid A Alam
(74) *Attorney, Agent, or Firm* — Conley Rose, P.C.

(57) ABSTRACT

A computer-implemented method includes receiving a query referencing entities, and determining non-polar questions (NPQs) for the query. Each of the NPQs omits a respective target entity (TE) of the entities. The method includes determining, for each of the NPQs, whether the NPQ is a non-matching NPQ by determining whether a top ranked answer for the NPQ matches the TE of the NPQ. The method includes proceeding to determine an updated input statement (UIS) for a non-matching NPQ by replacing the TE of the non-matching NPQs with the top ranked answer for the non-matching NPQ, determine an updated NPQ for the UIS, and determine whether the top ranked answer for the updated NPQ matches the TE of the updated NPQ, in an iterative or recursive manner. The method includes outputting a UIS as a substitute statement for the query.

20 Claims, 5 Drawing Sheets

(56) References Cited

U.S. PATENT DOCUMENTS

| | | | |
|---|---|---|---|
| 2011/0307435 A1 | 12/2011 | Overell et al. | |
| 2015/0007320 A1* | 1/2015 | Liu | H04L 63/14 726/23 |
| 2015/0019207 A1 | 1/2015 | Dou et al. | |
| 2015/0331712 A1* | 11/2015 | Brown | G06F 9/4843 718/102 |
| 2015/0371137 A1* | 12/2015 | Giffels | G06F 16/3329 706/46 |
| 2016/0012038 A1* | 1/2016 | Edwards | G06F 40/30 704/9 |
| 2016/0124952 A1 | 5/2016 | Bishop et al. | |
| 2016/0379120 A1 | 12/2016 | Merdivan et al. | |
| 2017/0351687 A1* | 12/2017 | Su | G06F 16/3322 |

OTHER PUBLICATIONS

Boguraev, et al., "Parallel and Nested Decomposition for Factoid Questions," Natural Language Engineering, Cambridge University Press vol. 20, Issu4, Oct. 2014, 28 pages.

Datla, et al., "Open Domain Real-Time Question Answering Based on Semantic and Syntactic Question Similarity," Proceedings of the Twenty-Fifth Text Retrieval Conference, TREC 2016, Gaithersburg, Maryland, Nov. 15-18, 2016, National Institute of Standards and Technology (NIST), 6 pages.

Kalyanpur, et al., "Fact-Based Question Decomposition for Candidate Answer Re-Ranking," C IKM'11, Oct. 24-28, 2011, Glasgow, Scotland, UK.Copyright 2011 ACM 978-1-4503-0717-8/11/10, pp. 2045-2048.

Lally, et al., "WatsonPaths: Scenario-based Question Answering and Inference over Unstructured Information," IBM Research Report, RC25489 (WAT1409-048) Sep. 17, 2014, 20 pages.

Li, "Beyond Question Answering: Understanding the Information Need of the User," Submitted for the degree of Doctor of Philosophy University of York Department of Computer Science, Sep. 2011, 194 pages.

Nguyen, et al., "Query-Driven On-The-Fly Knowledge Base Construction," Proceedings of the VLDB Endowment, vol. 11, No. 1, Rio de Janerio, Brazil, Aug. 2018, pp. 66-79.

Seyler, et al., "Knowledge Questions from Knowledge Graphs," htttps://arxiv.org/abs/1610.09935, Version 2, Nov. 1, 2016, 9 pages.

Boxwell, "Ancillary Speech Generation via Query Anserwering in Knowledge Graphs", U.S. Appl. No. 15/690,835, filed Aug. 30, 2017, 36 pages.

Boxwell, "Answering Polar Questions," U.S. Appl. No. 15/815,746, filed Nov. 17, 2017, 30 pages.

\* cited by examiner

DETERMINING SUBSTITUTE STATEMENTS

BACKGROUND

Statements or questions presented to a question/answering system may be so incorrect that the question/answering system is unable to determine a high confidence response. For example, a statement or question input to a question/answering system may include multiple entities that are not directly related, and the question/answering system may be unable to determine a high confidence response.

SUMMARY

According to an aspect of the present disclosure, a computer-implemented method includes receiving a query referencing first entities. The method includes determining non-polar questions for the query. Each of the non-polar questions omits a respective target entity of the first entities. The method includes determining, for each of the non-polar questions of the query, whether the non-polar question is a non-matching non-polar question by determining whether a top ranked answer for the non-polar question matches the target entity of the non-polar question. The method includes when one or more non-matching non-polar questions are identified, proceeding to determine one or more updated input statements for the one or more non-matching non-polar questions by replacing the target entity of each of the one or more non-matching non-polar questions with the top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met. The method includes outputting one or more of the updated input statements as a substitute statement for the query.

According to an aspect of the disclosure, a non-transitory computer readable storage media stores instructions that, when executed by a computer, cause the computer to receive a query referencing first entities. The instructions, when executed by the computer, cause the computer to determine non-polar questions for the query. Each of the non-polar questions omits a respective target entity of the first entities. The instructions, when executed by the computer, cause the computer to determine, for each of the non-polar questions, whether the non-polar question is a non-matching non-polar question. The instructions, when executed by the computer, cause the computer to, when one or more non-matching non-polar questions are identified, proceed to determine one or more updated input statements for the one or more non-matching non-polar questions by replacing the target entity of each of the one or more non-matching non-polar questions with a top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met. The instructions, when executed by the computer, cause the computer to output one or more of the updated input statements as a substitute statement for the query.

According to an aspect of the disclosure, a computer system includes memory storing program instructions. The computer system includes a processor coupled to the memory and configured to execute the program instructions stored on the memory to cause the processor to receive a query referencing first entities. The processor is configured to execute the instructions to determine non-polar questions for the input statement. Each of the non-polar questions omits a respective target entity of the first entities. The processor is configured to execute the instructions to determine, for each of the non-polar questions, whether the non-polar question is a non-matching non-polar question. The processor is configured to execute the instructions to, when one or more non-matching non-polar questions are identified, proceed to determine one or more updated input statements for the one or more non-matching non-polar questions by replacing the target entity of each of the one or more non-matching non-polar questions with a top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met. The processor is configured to output one or more of the updated input statements as a substitute statement for the input statement.

DETAILED DESCRIPTION

Figure 1:
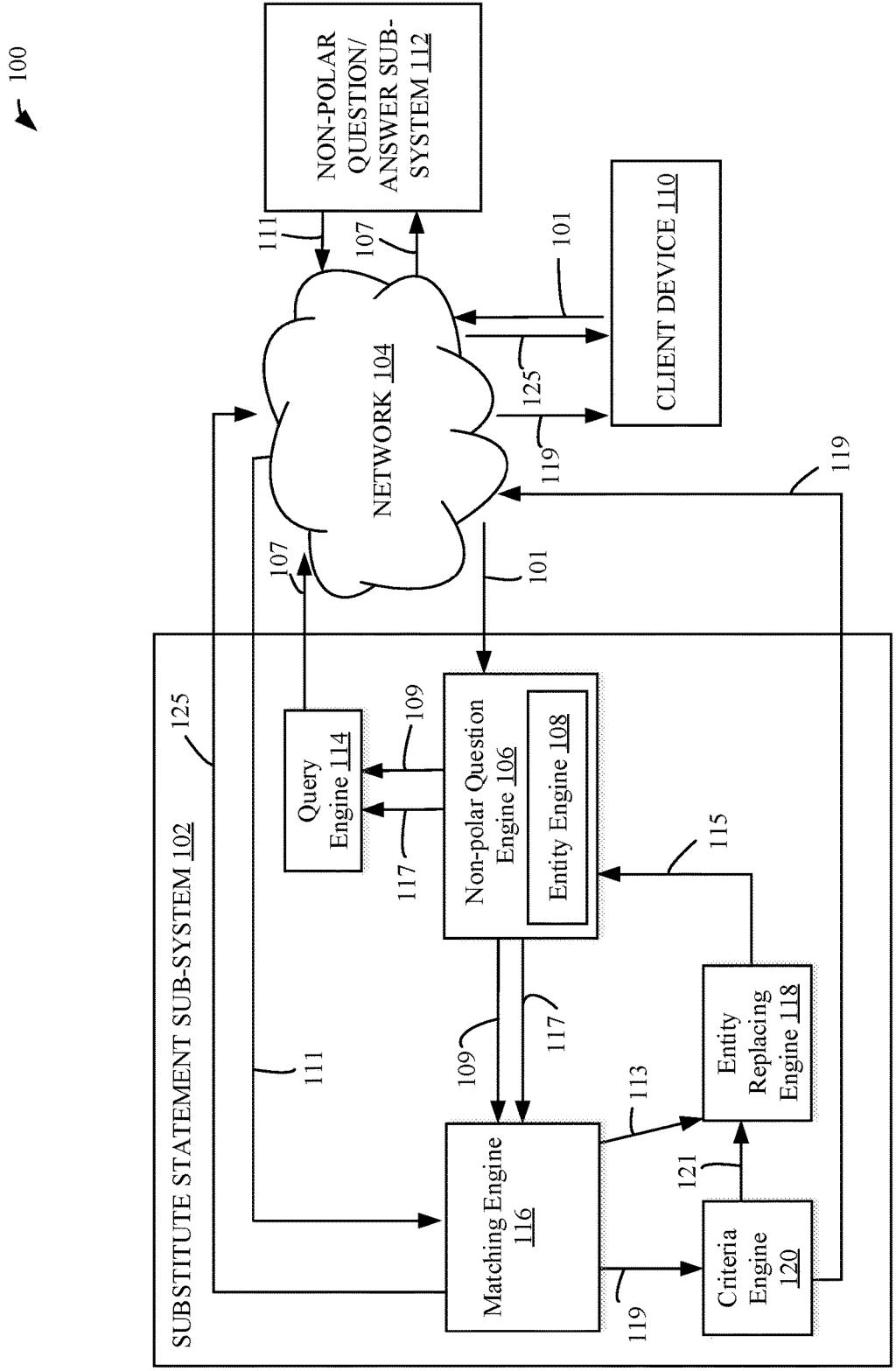
FIG. 1 is a block diagram view of an embodiment of a system according to the present disclosure.

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

An engine as referenced herein may comprise of software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The engine may be configured to use the data to execute one or more instructions to perform one or more tasks.

Embodiments of the disclosure include a system that determines and provides substitute statements to a client device responsive to receiving an input statement or polar question from the client device. A polar question is a yes/no question, a question presenting an exclusive disjunction, and/or a question with a pair of alternatives of which only one is acceptable as an answer. The input statement or polar question may include multiple entities, and the multiple entities may not be directly related (e.g., via knowledge graph). In some examples, the system determines the substitute statements using an iterative or recursive process to determine candidate substitute statements by replacing entities in a non-polar question. A non-polar question is an open question, typically requiring a statement as an answer; a wh-question (e.g., who, what, when, where, or why); and/or a how question. A non-polar answer is an answer to a non-polar question. The system determines whether the candidate substitute statements should be output to the client device as a substitute statement for the input statement or the polar question based on a matching algorithm. The substitute statements that are output may be high-confidence responses to the input statement or polar question. In some examples, one or more of the substitutes statements include only one of the entities in the query.

FIG. 1 illustrates an example of a system 100 configured to determine one or more substitute statements 119 for a query 101. The system 100 includes a client device 110 that provides the query 101 to the substitute statement sub-system 102. In the example illustrated in FIG. 1, the client device 110 provides the query 101 to the substitute statement sub-system 102 via the network 104. However, the client device 110 may provide the query 101 to the substitute statement sub-system 102 using a different communication means. The query 101 may be an input statement that references first entities or a polar question that references first entities. The entities in the query 101 may not be directly related (e.g., via a knowledge graph). As an example, when the query 101 is an input statement, the query 101 may correspond to "Tom Brady and Kevin Durant won the World Series." As another example, when the query 101 is a polar question, the query 101 may correspond to "Did Tom Brady and Kevin Durant win the World Series?". In the example query 101, Tom Brady (a football player) may not be directly related to Kevin Durant (a basketball player), and Tom Brady and Kevin Durant may not be related to winning the World Series (a baseball championship).

The substitute statement sub-system 102 includes a non-polar question engine 106 configured to receive the query 101 and generate non-polar questions 109 for the query 101. Each of the non-polar questions 109 omits a respective target entity of the first entities. The non-polar question engine 106 includes an entity engine 108 configured to identify the first entities in the query 101. In this embodiment, the entity engine 108 identifies the first entities in the query 101 using natural language processing (NLP). In the example query 101, the entity engine 108 identifies the first entities "Tom Brady," "Kevin Durant," and "World Series."

Once the first entities are determined, the non-polar question engine 106 is configured to remove one entity from the query 101 to generate non-polar questions 109 (with the remaining entities) that seek the removed entity as the answer. In the example query 101, the non-polar question engine 106 removes "World Series" to generate a first non-polar question "Tom Brady and Kevin Durant won what?" for the query 101. The target entity for the non-polar question "Tom Brady and Kevin Durant won what?" is the entity (World Series) that was removed from the query 101 to generate the non-polar question. Similarly, the non-polar question engine 106 separately removes "Tom Brady" and "Kevin Durant" from the query 101 to generate second and third non-polar questions "Tom Brady and who won the World Series?" and "Who and Kevin Durant won the World Series?", respectively. The target entity for the second non-polar question "Tom Brady and who won the World Series?" is the entity (Kevin Durant) that was removed from the query 101 to generate the second non-polar question. The target entity for the third non-polar question "Who and Kevin Durant won the World Series?" is the entity (Tom Brady) that was removed from the query 101 to generate the third non-polar question.

The non-polar questions 109 are provided to a query engine 114 configured to query the non-polar question/answer sub-system 112 for non-polar answers 111 (e.g., "first answers") to the non-polar questions 109. The non-polar question/answer sub-system 112 determines the non-polar answers 111 to the non-polar questions 109, and provides the non-polar answers 111 to the matching engine 116. In some embodiments, several answers may be received for each of the non-polar questions 109. In embodiments in which several answers are received, the non-polar answers 111 include a set of ranked lists of non-polar answers 111. The ranked lists may be based on a pre-determined criteria, such as most common answer, most popular answer, alphabetical order, and most recently occurring answers in the searched knowledge base.

The matching engine 116 is configured to receive the non-polar answers 111 from the non-polar question/answer sub-system 112 (e.g., via the network 104), and determine, for each of the non-polar questions 109, whether the non-polar question is a non-matching non-polar question 113. In some examples, the matching engine 116 determines whether a non-polar question 109 is a non-matching non-polar question 113 by determining whether a top ranked answer for the non-polar question 109 matches the target entity of the non-polar question 109.

To illustrate using the above example non-polar questions 109, the query engine 114 queries the non-polar question/answer sub-system 112 for non-polar answers to the first, second, and third non-polar questions. In response to the first non-polar question "Tom Brady and Kevin Durant won what?", the non-polar question/answer sub-system 112 may determine, and the matching engine 116 may receive, a ranked list of "Superbowl, NBA championship." Similarly, in response to the second and third non-polar questions "Tom Brady and who won the World Series?" and "Who and Kevin Durant won the World Series?", the non-polar question/answer sub-system 112 may determine, and the matching engine 116 may receive, lists containing "Bill Belichick, Robert Gronkowski" and "Stephen Curry," respectively. Once the non-polar answers 111 are received, the matching engine 116 determines for the first non-polar question "Tom Brady and Kevin Durant won what?" that the top ranked answer (Superbowl) for the first non-polar question does not match the target entity (World Series) for the first non-polar question. As another example, the matching engine 116 determines for the second non-polar question "Tom Brady and who won the World Series?" that the top ranked answer (Bill Belichick) for the second non-polar question does not match the target entity (Kevin Durant) for the second non-polar question. As another example, the matching engine 116 determines for the third non-polar question "Who and Kevin Durant won the World Series?" that the top ranked answer (Stephen Curry) for the third non-polar question does not match the target entity (Tom Brady) for the third non-polar question. Thus, in this example, the matching engine 116 determines that the first, second, and third non-polar questions "Tom Brady and Kevin Durant won what?", "Tom Brady and who won the World Series," and "Who and Kevin Durant won the World Series?" are non-matching non-polar questions 113.

When the target entities of all of the non-polar questions 109 match the respective top ranked answers of the non-polar questions 109, the matching engine 116 outputs (e.g., output 125) the input statement of the query 101 as a correct statement or outputs a 'Yes' answer for the polar question of the query 101. When one or more non-matching non-polar questions 113 are identified, the substitute statement sub-system 102 iterates through entity replacing, non-polar question generating, and matching operations in an iterative or recursive manner using an entity replacing engine 118, the non-polar question engine 106, the query engine 114, and the matching engine 116, until a criteria engine 120 determines that a criteria is met.

Returning to the example, because one or more of the non-polar questions 109 are identified as being non-matching non-polar questions 113, the substitute statement sub-system 102 begins iterating through the entity replacing, non-polar question generating, and matching operations in an iterative or recursive manner. Two iterations through the entity replacing, non-polar question generating, and matching operations will now be described in detail.

A first iteration begins with the entity replacing engine 118 determining one or more updated input statements 115 for the one or more non-matching non-polar questions 113 by replacing the target entity of each of the one or more non-matching non-polar questions 113 with the top ranked answer for the non-matching non-polar question. Each of the one or more updated input statements 115 references one or more entities.

To illustrate using the above example non-matching non-polar questions 113, the entity replacing engine 118 determines a first updated input statement "Tom Brady and Kevin Durant won the Superbowl" for the first (non-matching) non-polar question "Tom Brady and Kevin Durant won what?" by replacing the target entity (World Series) for the first non-polar question with the top ranked answer (Superbowl) for the first non-polar question. As another example, the entity replacing engine 118 determines a second updated input statement "Tom Brady and Bill Belichick won the World Series" for the second (non-matching) non-polar question "Tom Brady and who won the World Series?" by replacing the target entity (Kevin Durant) for the second non-polar question with the top ranked answer (Bill Belichick) for the second non-polar question. As another example, the entity replacing engine 118 determines a third updated input statement "Stephen Curry and Kevin Durant won the World Series" for the third (non-matching) non-polar question "Who and Kevin Durant won the World Series?" by replacing the target entity (Tom Brady) for the third non-polar question with the top ranked answer (Stephen Curry) for the third non-polar question.

The first iteration proceeds with the entity replacing engine 118 providing the updated input statements 115 to the non-polar question engine 106. The non-polar question engine 106 determines one or more updated non-polar questions 117 for the one or more updated input statements 115 as described above with reference to the non-polar questions 109 and the query 101. The non-polar question engine 106 removes a single entity from each of the one or more updated input statements 115 to generate one or more updated non-polar questions 117 (with the remaining entities) that seek the removed entity as the answer. Thus, the updated non-polar questions 117 omit a respective target entity of the entities of a corresponding updated input statement.

To illustrate, for the first updated input statement, the non-polar question engine 106 removes the entity "Superbowl" from the first updated input statement to generate a first updated non-polar question "Tom Brady and Kevin Durant won what?". Similarly, the non-polar question engine 106 separately removes the entities "Kevin Durant" and "Tom Brady" from the first updated input statement to generate second and third updated non-polar questions "Tom Brady and who won the Superbowl?" and "Who and Kevin Durant won the Superbowl?", respectively. The target entity for the first updated non-polar question "Tom Brady and Kevin Durant won what?" is the entity (Superbowl) that was removed from the first updated input statement to generate the first updated non-polar question. The target entity for the second updated non-polar question "Tom Brady and who won the Superbowl?" is the entity (Kevin Durant) that was removed from the first updated input statement to generate the second updated non-polar question. Similarly, the target entity for the third updated non-polar question "Who and Kevin Durant won the Superbowl?" is the entity (Tom Brady) that was removed from the first updated input statement to generate the third updated non-polar question.

As another example, for the second updated input statement, the non-polar question engine 106 removes the entity "World Series" from the second updated input statement to generate a fourth updated non-polar question "Tom Brady and Bill Belichick won what?". Similarly, the non-polar question engine 106 separately removes the entities "Bill Belichick" and "Tom Brady" from the second updated input statement to generate fifth and sixth updated non-polar questions "Tom Brady and who won the World Series?", and "Who and Bill Belichick won the World Series?", respectively. The target entity for the fourth updated non-polar question "Tom Brady and Bill Belichick won what?" is the entity (World Series) that was removed from the second updated input statement to generate the fourth updated non-polar question. The target entity for the fifth updated non-polar question "Tom Brady and who won the World Series?" is the entity (Bill Belichick) that was removed from the second updated input statement to generate the fifth updated non-polar question. Similarly, the target entity for the sixth updated non-polar question "Who and Bill Belichick won the World Series?" is the entity (Tom Brady)

that was removed from the second updated input statement to generate the sixth updated non-polar question.

As another example, for the third updated input statement, the non-polar question engine 106 removes the entity "World Series" from the third updated input statement to generate a seventh updated non-polar question "Stephen Curry and Kevin Durant won what?". Similarly, the non-polar question engine 106 separately removes the entities "Kevin Durant" and "Stephen Curry" from the third updated input statement to generate eighth and ninth updated non-polar questions "Stephen Curry and who won the World Series?" and "Who and Kevin Durant won the World Series?", respectively. The target entity for the seventh updated non-polar question "Stephen Curry and Kevin Durant won what?" is the entity (World Series) that was removed from the third updated input statement to generate the seventh updated non-polar question. The target entity for the eighth updated non-polar question "Stephen Curry and who won the World Series?" is the entity (Kevin Durant) that was removed from the third updated input statement to generate the eighth updated non-polar question. Similarly, the target entity for the ninth updated non-polar question "Who and Kevin Durant won the World Series?" is the entity (Stephen Curry) that was removed from the third updated input statement to generate the ninth updated non-polar question.

The first iteration proceeds with the non-polar question engine 106 providing the updated non-polar questions 117 to the query engine 114, which sends a query 107 to the non-polar question/answer sub-system 112 for non-polar answers 111 to the updated non-polar questions 117. The non-polar question/answer sub-system 112 determines non-polar answers 111 (e.g., "second answers") for the updated non-polar questions 117. The non-polar answers 111 for the updated non-polar questions 117 may include ranked lists of answers as described above with reference to the non-polar answers 111 for the non-polar questions 109.

The first iteration proceeds with the matching engine 116 receiving the non-polar answers 111 to the updated non-polar questions 117, and determining whether the top ranked answer for each of the updated non-polar questions 117 matches the target entity of the updated non-polar question. To illustrate, for the first updated non-polar question "Tom Brady and Kevin Durant won what?", the non-polar question/answer sub-system 112 determines, and the matching engine 116 receives, a ranked list of "Superbowl, NBA championship." Similarly, in response to the second updated non-polar question "Tom Brady and who won the Superbowl?", the non-polar question/answer sub-system 112 determines, and the matching engine 116 receives, a ranked list containing "Bill Belichick, Robert Gronkowski". Similarly, in response to the third updated non-polar question "Who and Kevin Durant won the Superbowl?", the non-polar question/answer sub-system 112 determines, and the matching engine 116 receives, a ranked list containing "Stephen Curry, Russell Westbrook". As another example, for the fourth updated non-polar question "Tom Brady and Bill Belichick won what?", the non-polar question/answer sub-system 112 determines, and the matching engine 116 receives, a ranked list including "Superbowl, most valuable player (MVP)". Similarly, in response to the fifth updated non-polar question "Tom Brady and who won the World Series?", the non-polar question/answer sub-system 112 determines, and the matching engine 116 receives, a ranked list containing "Bill Belichick, Robert Gronkowski". Similarly, in response to the sixth updated non-polar question "Who and Bill Belichick won the World Series?", the non-polar question/answer sub-system 112 determines, and the matching engine 116 receives, a ranked list containing "Robert Gronkowski, Tom Brady," respectively. As another example, for the seventh updated non-polar question "Stephen Curry and Kevin Durant won what?", the non-polar question/answer sub-system 112 determines, and the matching engine 116 receives, a ranked list including "NBA championship." Similarly, in response to the eighth updated non-polar question "Stephen Curry and who won the World Series?", the non-polar question/answer sub-system 112 determines, and the matching engine 116 receives, a ranked list containing "Kevin Durant". Similarly, in response to the ninth updated non-polar question "Who and Kevin Durant won the World Series?", the non-polar question/answer sub-system 112 determines, and the matching engine 116 receives, a ranked list containing "Stephen Curry".

Once the non-polar answers 111 for the updated non-polar questions 117 are received, the first iteration proceeds with the matching engine 116 determining whether the top ranked answer for each of the updated non-polar questions 117 matches the target entity of the non-polar question. To illustrate, for the first updated non-polar question "Tom Brady and Kevin Durant won what?", the matching engine 116 determines that the top ranked answer (Superbowl) for the first updated non-polar question matches the target entity (Superbowl) for the first updated non-polar question. As another example, for the second updated non-polar question "Tom Brady and who won the Superbowl?", the matching engine 116 determines that the top ranked answer (Bill Belichick) for the second updated non-polar question does not match the target entity (Kevin Durant) for the second updated non-polar question. As another example, for the third updated non-polar question "Who and Kevin Durant won the Superbowl?", the matching engine 116 determines that the top ranked answer (Stephen Curry) for the third updated non-polar question does not match the target entity (Tom Brady) for the third updated non-polar question.

As another example, for the fourth updated non-polar question "Tom Brady and Bill Belichick won what?", the matching engine 116 determines that the top ranked answer (Superbowl) for the fourth updated non-polar question does not match the target entity (World Series) for the fourth updated non-polar question. As another example, for the fifth updated non-polar question "Tom Brady and who won the World Series?", the matching engine 116 determines that the top ranked answer (Bill Belichick) for the fifth updated non-polar question matches the target entity (Bill Belichick) for the fifth updated non-polar question. As another example, for the sixth updated non-polar question "Who and Bill Belichick won the World Series?", the matching engine 116 determines that the top ranked answer (Robert Gronkowski) for the sixth updated non-polar question does not match the target entity (Tom Brady) for the sixth updated non-polar question.

As another example, for the seventh updated non-polar question "Stephen Curry and Kevin Durant won what?", the matching engine 116 determines that the top ranked answer (NBA championship) for the seventh updated non-polar question does not match the target entity (World Series) for the seventh updated non-polar question. As another example, for the eighth updated non-polar question "Stephen Curry and who won the World Series?", the matching engine 116 determines that the top ranked answer (Kevin Durant) for the eighth updated non-polar question matches the target entity (Kevin Durant) for the eighth updated non-polar question. As another example, the matching engine 116 determines for the ninth updated non-polar question "Who and Kevin Durant won the World Series?" that the top ranked answer (Stephen Curry) for the ninth updated non-polar question matches the target entity (Stephen Curry) for the ninth updated non-polar question. Thus, the matching engine 116 determines that the top ranked answer for each of the second, third, fourth, sixth, and seventh updated non-polar questions does not match the question's corresponding target entity.

At the end of the first iteration, the matching engine 116 provides any substitute statements 119 to the criteria engine 120, and provides any non-matching non-polar questions 113 to the entity replacing engine 118. A substitute statement 119 is an updated input statement whose updated non-polar questions 117 do not include any non-matching non-polar questions 113. In other words, when the answer for each updated non-polar question for an updated input statement matches the target entity of the updated non-polar question, the matching engine 116 determines that the updated input statement is a substitute statement 119 for the query 101. In the example, at least one non-polar question of each of the updated input statements 115 for the first iteration is determined to be non-matching, and, consequently, none of the updated input statements 115 for the first iteration is determined to be a substitute statement 119.

The criteria engine 120 determines whether a criteria is met and controls whether another iteration is performed and/or whether any determined substitute statements 119 are output. In some examples, the criteria may correspond to determining a particular number N (where N>0) of substitute statements 119 and/or may include that a particular number of iterations have been performed. In these examples, when the criteria engine 120 determines that the criteria (e.g., a particular number of substitute statements 119 are determined or a particular number of iterations has been performed) is met and at least one substitute statement 119 has been determined, the criteria engine 120 outputs any determined substitute statements 119 as substitute statements for the query 101 and the processing stops. When the criteria engine 120 determines that the criteria (e.g., a particular number of iterations) is met and no substitute statements 119 have been identified, the substitute statement sub-system 102 stops iterating and may output the updated input statements 115 of the most recent iteration. When the criteria engine 120 determines that the criteria is not met, a subsequent iteration is performed using the updated non-matching non-polar questions 113. In some examples, the criteria engine 120 outputs a trigger signal 121 to instruct the substitute statement sub-system 102 to perform a subsequent iteration.

Returning to the example, because none of the updated input statements 115 for the first iteration are determined to be substitute statements 119, the criteria engine 120 determines that the number (0) of substitute statements 119 is less than the particular number (e.g., 2) required to satisfy the criteria, and the substitute statement sub-system 102 will therefore proceed to perform a second iteration through the entity replacing, non-polar question generating, and matching operations with the updated non-polar questions 117 (of the first iteration) whose target entity did not match the top ranked answer for the question acting as the non-matching non-polar questions 113 for the second iteration.

In the example, the non-matching non-polar questions 113 for the second iteration are: i) the second updated non-polar question "Tom Brady and who won the Superbowl?"; ii) the third updated non-polar question "Who and Kevin Durant won the Superbowl?"; iii) the fourth updated non-polar question "Tom Brady and Bill Belichick won what?"; iv) the sixth updated non-polar question "Who and Bill Belichick won the World Series?"; and v) the seventh updated non-polar question "Stephen Curry and Kevin Durant won what?". In this example, the second iteration proceeds with the entity replacing engine 118 replacing the target entity (Kevin Durant) for the second updated non-polar question with the top ranked answer (Bill Belichick) for the second updated non-polar question to generate a fourth updated input statement of "Tom Brady and Bill Belichick won the Superbowl" for the second iteration. The entity replacing engine 118 also replaces the target entity (Tom Brady) for the third updated non-polar question with the top ranked answer (Stephen Curry) for the third updated non-polar question to generate a fifth updated input statement of "Stephen Curry and Kevin Durant won the Superbowl" for the second iteration. The entity replacing engine 118 also replaces the target entity (World Series) for the fourth updated non-polar question with the top ranked answer (Superbowl) to generate a sixth updated input statement of "Tom Brady and Bill Belichick won the Superbowl" for the second iteration. The entity replacing engine 118 also replaces the target entity (Tom Brady) for the sixth updated non-polar question with the top ranked answer (Robert Gronkowski) for the sixth updated non-polar question to generate a seventh updated input statement of "Robert Gronkowski and Bill Belichick won the World Series." The entity replacing engine 118 also replaces the target entity (World Series) for the seventh updated non-polar question with the top ranked answer (NBA championship) for the seventh updated non-polar question to generate an eighth updated input statement of "Stephen Curry and Kevin Durant won the NBA championship" for the second iteration.

The entity replacing engine 118 provides the updated input statements 115 for the second iteration to the non-polar question engine 106, and the second iteration proceeds with the non-polar question engine 106 determining updated non-polar questions 117 for the second iteration for each of the updated input statements 115 of the second iteration as described above with respect to the updated non-polar questions 117 for the first iteration.

For example, for the fourth updated input statement "Tom Brady and Bill Belichick won the Superbowl", the non-polar question engine 106 generates a tenth updated non-polar question "Tom Brady and Bill Belichick won what?", an eleventh updated non-polar question "Tom Brady and who won the Superbowl?", and a twelfth updated non-polar question "Who and Bill Belichick won the Superbowl?". The target entity for the tenth updated non-polar question "Tom Brady and Bill Belichick won what?" is the entity (Superbowl) that was removed from the fourth updated input statement to generate the tenth updated non-polar question. The target entity for the eleventh updated non-polar question "Tom Brady and who won the Superbowl?" is the entity (Bill Belichick) that was removed from the fourth updated input statement to generate the eleventh updated non-polar question. Similarly, the target entity for the twelfth updated non-polar question "Who and Bill Belichick won the Superbowl?" is the entity (Tom Brady) that was removed from the fourth updated input statement to generate the twelfth updated non-polar question.

As another example, for the fifth updated input statement "Stephen Curry and Kevin Durant won the Superbowl", the non-polar question engine 106 determines a thirteenth updated non-polar question "Stephen Curry and Kevin Durant won what?", a fourteenth updated non-polar question "Stephen Curry and who won the Superbowl?", and a fifteenth updated non-polar question "Who and Kevin Durant won the Superbowl?". The target entity for the thirteenth updated non-polar question "Stephen Curry and Kevin Durant won what?" is the entity (Superbowl) that was removed from the fifth updated input statement to generate the thirteenth updated non-polar question. The target entity for the fourteenth updated non-polar question "Stephen Curry and who won the Superbowl?" is the entity (Kevin Durant) that was removed from the fifth updated input statement to generate the fourteenth updated non-polar question. Similarly, the target entity for the fifteenth updated non-polar question "Who and Kevin Durant won the Superbowl?" is the entity (Stephen Curry) that was removed from the fifth updated input statement to generate the fifteenth updated non-polar question.

As another example, for the sixth updated input statement "Tom Brady and Bill Belichick won the Superbowl," the non-polar question engine 106 may not generate any questions because this updated input statement is the same as the fourth updated input statement.

As another example, for the seventh updated input statement "Robert Gronkowski and Bill Belichick won the World Series", the non-polar question engine 106 determines a sixteenth updated non-polar question "Robert Gronkowski and Bill Belichick won what?", a seventeenth updated non-polar question "Robert Gronkowski and who won the World Series?", and an eighteenth updated non-polar question "Who and Bill Belichick won the World Series?". The target entity for the sixteenth updated non-polar question "Robert Gronkowski and Bill Belichick won what?" is the entity (World Series) that was removed from the seventh updated input statement to generate the sixteenth updated non-polar question. The target entity for the seventeenth updated non-polar question "Robert Gronkowski and who won the World Series?" is the entity (Bill Belichick) that was removed from the seventeenth updated input statement to generate the seventeenth updated non-polar question. Similarly, the target entity for the eighteenth updated non-polar question "Who and Bill Belichick won the World Series?" is the entity (Robert Gronkowski) that was removed from the seventh updated input statement to generate the eighteenth updated non-polar question.

As another example, for the eighth updated input statement "Stephen Curry and Kevin Durant won the NBA championship", the non-polar question engine 106 determines a nineteenth updated non-polar question "Stephen Curry and Kevin Durant won what?", a twentieth updated non-polar question "Stephen Curry and who won the NBA championship?", and a twenty-first updated non-polar question "Who and Kevin Durant won the NBA championship?". The target entity for the nineteenth updated non-polar question "Stephen Curry and Kevin Durant won what?" is the entity (NBA Championship) that was removed from the eighth updated input statement to generate the sixteenth updated non-polar question. The target entity for the twentieth updated non-polar question "Stephen Curry and who won the NBA Championship?" is the entity (Kevin Durant) that was removed from the eighth updated input statement to generate the twentieth updated non-polar question. Similarly, the target entity for the twenty-first updated non-polar question "Who and Kevin Durant won the NBA Championship?" is the entity (Stephen Curry) that was removed from the eighth updated input statement to generate the eighteenth updated non-polar question.

The non-polar question engine 106 provides the updated non-polar questions 117 for the second iteration to the query engine 114, which sends a query 107 to the non-polar question/answer sub-system 112 for non-polar answers 111 to the updated non-polar questions 117. The non-polar question/answer sub-system 112 determines non-polar answers 111 (e.g., "third answers") for the updated non-polar questions 117. The non-polar answers 111 for the updated non-polar questions 117 may include ranked lists of answers as described above with reference to the non-polar answers 111 for the non-polar questions 109. The matching engine 116 receives the non-polar answers 111 to the updated non-polar questions 117.

To illustrate, for the tenth updated non-polar question "Tom Brady and Bill Belichick won what?", the non-polar question/answer sub-system 112 determines, and the matching engine 116 receives, a ranked list of "Superbowl, MVP." Similarly, in response to the eleventh and twelfth updated non-polar questions "Tom Brady and who won the Superbowl?" and "Who and Bill Belichick won the Superbowl?", the non-polar question/answer sub-system 112 determines, and the matching engine 116 receives, ranked lists containing "Bill Belichick, Robert Gronkowski" and "Tom Brady, Robert Gronkowski", respectively. As another example, for the thirteenth updated non-polar question "Stephen Curry and Kevin Durant won what?", the non-polar question/answer sub-system 112 determines, and the matching engine 116 receives, a ranked list including "NBA championship." Similarly, in response to the fourteenth and fifteenth updated non-polar questions "Stephen Curry and who won the Superbowl?" and "Who and Kevin Durant won the Superbowl?", the non-polar question/answer sub-system 112 determines, and the matching engine 116 receives, ranked lists containing "Kevin Durant" and "Stephen Curry," respectively. As another example, for the sixteenth updated non-polar question "Robert Gronkowski and Bill Belichick won what?", the non-polar question/answer sub-system 112 determines, and the matching engine 116 receives, a ranked list including "Superbowl." Similarly, in response to the seventeenth and eighteenth updated non-polar questions "Robert Gronkowski and who won the World Series?" and "Who and Bill Belichick won the World Series?", the non-polar question/answer sub-system 112 determines, and the matching engine 116 receives, lists containing "Tom Brady" and "Robert Gronkowski, Tom Brady," respectively. As another example, for the nineteenth updated non-polar question "Stephen Curry and Kevin Durant won what?", the non-polar question/answer sub-system 112 determines, and the matching engine 116 receives, a ranked list including "NBA championship." Similarly, for the twentieth and twenty-first updated non-polar questions "Stephen Curry and who won the NBA championship?" and "Who and Kevin Durant won the NBA championship?", the non-polar question/answer sub-system 112 determines, and the matching engine 116 receives, lists containing "Kevin Durant" and "Stephen Curry," respectively.

The second iteration proceeds with the matching engine 116 determining whether the top ranked answer for each of the updated non-polar questions 117 matches the target entity of the updated non-polar question. As an example, for the tenth updated non-polar question "Tom Brady and Bill Belichick won what?", the matching engine 116 determines that the top ranked answer (Superbowl) for the tenth updated non-polar question matches the target entity (Superbowl) for the tenth updated non-polar question. As another example, for the eleventh updated non-polar question "Tom Brady and who won the Superbowl?", the matching engine 116 determines that the top ranked answer (Bill Belichick) for the eleventh updated non-polar question matches the target entity (Bill Belichick) for the eleventh updated non-polar question. As another example, for the twelfth updated non-polar question "Who and Bill Belichick won the Superbowl?", the matching engine 116 determines that the top ranked answer (Tom Brady) for the twelfth updated non-polar question matches the target entity (Tom Brady) for the question. As another example, for the thirteenth updated non-polar question "Stephen Curry and Kevin Durant won what?", the matching engine 116 determines that the top ranked answer (NBA Championship) for the thirteenth updated non-polar question does not match the target entity (Superbowl) for the thirteenth updated non-polar question. As another example, for the fourteenth updated non-polar question "Stephen Curry and who won the Superbowl?", the matching engine 116 determines that the top ranked answer (Kevin Durant) for the fourteenth updated non-polar question matches the target entity (Kevin Durant) for the fourteenth updated non-polar question. As another example, for the fifteenth updated non-polar question "Who and Kevin Durant won the Superbowl?", the matching engine 116 determines that the top ranked answer (Stephen Curry) for the fifteenth updated non-polar question matches the target entity (Stephen Curry) for the fifteenth updated non-polar question. As another example, for the sixteenth updated non-polar question "Robert Gronkowski and Bill Belichick won what?", the matching engine 116 determines that the top ranked answer (Superbowl) for the sixteenth updated non-polar question does not match the target entity (World Series) for the sixteenth updated non-polar question. As another example, for the seventeenth updated non-polar question "Robert Gronkowski and who won the World Series?", the matching engine 116 determines that the top ranked answer (Tom Brady) for the seventeenth updated non-polar question does not match the target entity (Bill Belichick) for the seventeenth updated non-polar question. As another example, for the eighteenth updated non-polar question "Who and Bill Belichick won the World Series?", the matching engine 116 determines that the top ranked answer (Robert Gronkowski) for the eighteenth updated non-polar question matches the target entity (Robert Gronkowski) for the eighteenth updated non-polar question. As another example, for the nineteenth updated non-polar question "Stephen Curry and Kevin Durant won what?", the matching engine 116 determines that the top ranked answer (NBA championship) for the nineteenth updated non-polar question matches the target entity (NBA championship) for the nineteenth updated non-polar question. As another example, for the twentieth updated non-polar question "Stephen Curry and who won the NBA championship?", the matching engine 116 determines that the top ranked answer (Kevin Durant) for the twentieth updated non-polar question matches the target entity (Kevin Durant) for the twentieth updated non-polar question. As another example, for the twenty-first updated non-polar question "Who and Kevin Durant won the NBA championship?", the matching engine 116 determines that the top ranked answer (Stephen Curry) for the twenty-first updated non-polar question matches the target entity (Stephen Curry) for the twenty-first updated non-polar question.

The matching engine 116 provides any substitute statements 119 to the criteria engine 120, and provides any non-matching non-polar questions 113 to the entity replacing engine 118. In this example, because the top ranked answer for each of the tenth, eleventh, and twelfth updated non-polar questions generated for the fourth updated input statement matches the target entity for the non-polar question, the matching engine 116 determines that the fourth updated input statement is a substitute statement 119. Similarly, because the top ranked answer for each of the nineteenth, twentieth, and twenty-first updated non-polar questions generated for the eighth updated input statement matches the target entity for the question, the matching engine 116 determines that the eighth updated input statement is a substitute statement 119.

At the end of the second iteration, the criteria engine 120 determines whether a criteria is met and controls whether another iteration is performed and/or whether the substitute statements 119 are output as described above. Returning to the example, because two substitute statements 119 have been determined, the criteria engine 120 determines that the number (2) of substitute statements 119 is not less than the particular number (e.g., 2) required to satisfy the criteria, and the substitute statement sub-system 202 will therefore output the substitute statements 119. In the example, each of the substitute statements 119 is correct, and each of the substitute statements 119 includes only one of the entities originally in the query 101.

Thus, using a recursive or iterative approach to determining candidate substitute statements that include replacement entities, the system 100 determines one or more (correct) substitute statements 119 for an incorrect query that may not include any directly related entities.

Figure 2:
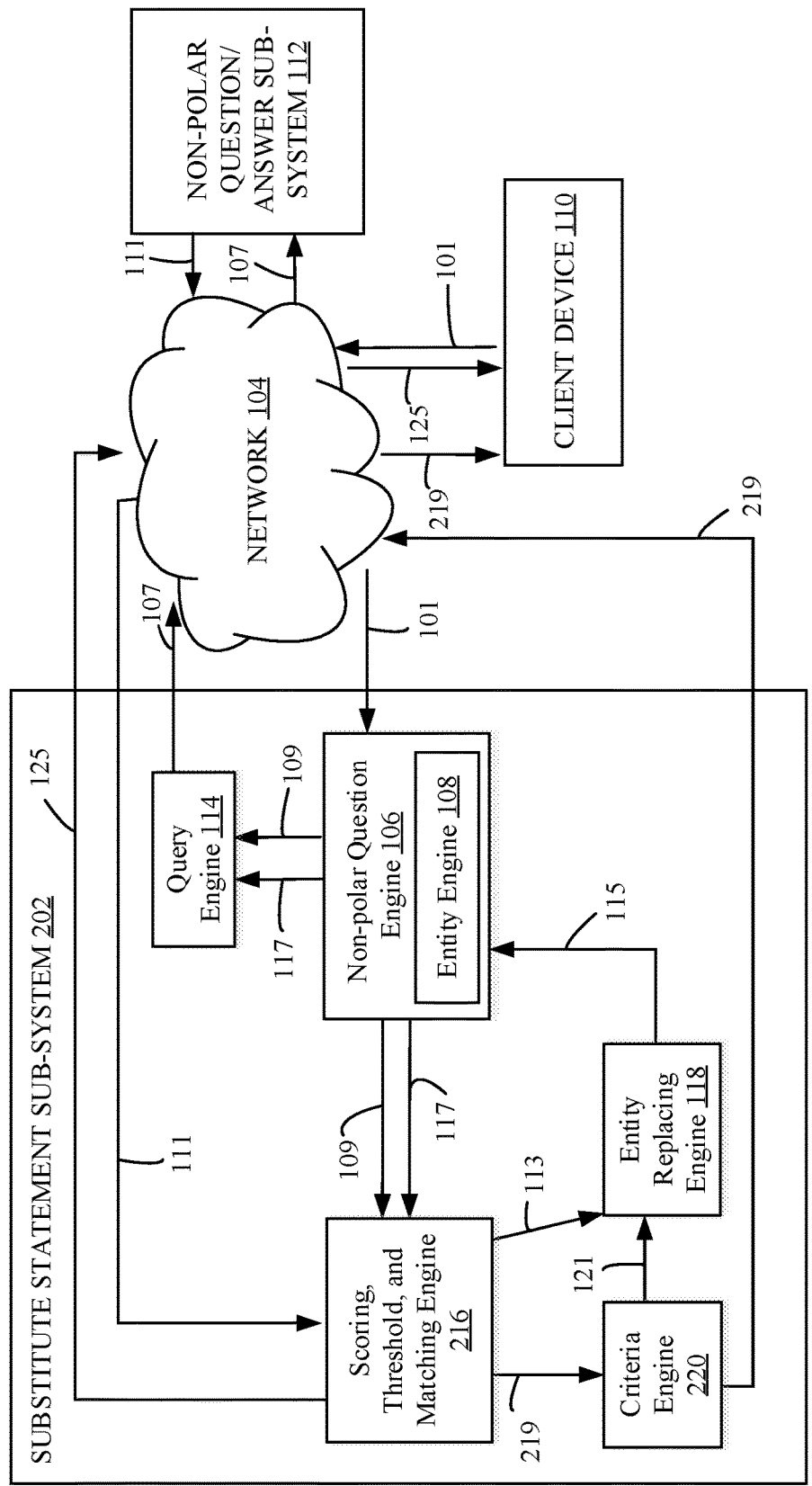
FIG. 2 is a block diagram view of an embodiment of a system according to the present disclosure.

FIG. 2 illustrates an example of a system 200 configured to determine one or more substitute statements 219 for a query 101. Engines and/or sub-systems 106, 108, 112, 114, and 118 operate as described above with reference to the corresponding engines of FIG. 1. Therefore, details regarding these engines may be skipped during the description of FIG. 2. In general, the difference between the system 200 and the system 100 is that the system 200 uses a scoring, threshold, and matching engine 216 in lieu of or in addition to the matching engine 116 of FIG. 1.

The scoring, threshold, and matching engine 216 is configured to determine a score of the non-polar questions 109 based on a rank of the removed entity of the non-polar question in the ranked list for the non-polar question. That is, when a ranked list for a non-polar question ranks a removed entity of the non-polar question at fourth on the ranked list, the removed entity is considered less likely to be correct than if the removed entity appeared as the first ranked on the ranked list for the non-polar question. To illustrate using the example non-polar answers 111 to the example non-polar questions 109 of FIG. 1, the scoring, threshold, and matching engine 216 determines for the first non-polar question "Tom Brady and Kevin Durant won what?" that the answer list (Superbowl, NBA championship) for the first non-polar question does not include the target entity (World Series) for the first non-polar question. Thus, the scoring, threshold, and matching engine 216 determines a score of 0 for the first non-polar question. As another example, the scoring, threshold, and matching engine 216 determines for the second non-polar question "Tom Brady and who won the World Series?" that the answer list (Bill Belichick, Robert Gronkowski) for the second non-polar question does not match the target entity (Kevin Durant) for the second non-polar question. Thus, the scoring, threshold, and matching engine 216 determines a score of 0 for the second non-polar question. As another example, the scoring, threshold, and matching engine 216 determines for the third non-polar question "Who and Kevin Durant won the World Series?" that the answer list (Stephen Curry) for the third non-polar question does not include the target entity (Tom Brady) for the third non-polar question. Thus, the scoring, threshold, and matching engine 216 determines a score of 0 for the third non-polar question.

Once the score for each of the non-polar questions 109 is determined, the scoring, threshold, and matching engine 216 determines whether the average score for the non-polar questions 109 satisfies a threshold. When the average score for the non-polar questions 109 satisfies the threshold, the scoring, threshold, and matching engine 216 outputs the input statement of the query 101 as a correct statement or outputs an answer 'Yes' to the polar question of the query 101. When the average score does not satisfy the threshold, the substitute statement sub-system 202 iterates through the entity replacing, non-polar question generating, and scoring, threshold, and matching operations using the entity replacing engine 118, the non-polar question engine 106, and the scoring, threshold, and matching engine 216, in a recursive or iterative manner, until a criteria determined by the criteria engine 220 is met.

Returning to the example, the threshold may be 80%, and the scoring, threshold, and matching engine 216 may determine that the average score (0) for the non-polar answers 111 for the non-polar questions 109 does not satisfy the threshold. Because the average score for the non-polar answers 111 for the non-polar questions 109 does not satisfy the threshold, the substitute statement sub-system 202 iterates through the entity replacing, non-polar question generating, and scoring, threshold, and matching operations using the entity replacing engine 118, the non-polar question engine 106, and the scoring, threshold, and matching engine 216, in a recursive or iterative manner, until a criteria determined by the criteria engine 220 is met. Two iterations through the entity replacing, non-polar question generating, and scoring, threshold, and matching operations will now be described.

A first iteration begins with the entity replacing engine 118 determining one or more updated input statements 115 for the one or more non-matching non-polar questions 113 by replacing the target entity of each of the one or more non-matching non-polar questions 113 with the top ranked answer for the non-matching non-polar question as described above with reference to FIG. 1. For example, the entity replacing engine 118 may determine the first, second, and third updated input statements as described above with reference to FIG. 1.

The first iteration proceeds with the non-polar question engine 106 determining one or more updated non-polar questions 117 for the one or more updated input statements 115 as described above with reference to FIG. 1. For example, the non-polar question engine 106 may determine the first through ninth updated non-polar questions described above with reference to FIG. 1.

The first iteration proceeds with the scoring, threshold, and matching engine 216 receiving non-polar answers 111 for the updated non-polar questions 117 for the updated input statement. The non-polar answers 111 received may correspond to the second answers described above with reference to FIG. 1.

The first iteration proceeds with the scoring, threshold, and matching engine 216 determining, for each of the updated input statements 115, whether the updated input statement is correct (e.g., a substitute statement 219) by determining whether an average score for the updated non-polar questions 117 for the updated input statement satisfies the threshold.

To illustrate, for the first updated non-polar question "Tom Brady and Kevin Durant won what?", the scoring, threshold, and matching engine 216 determines that the top ranked answer (Superbowl) for the first updated non-polar question matches the target entity (Superbowl) for the first updated non-polar question. Thus, the scoring, threshold, and matching engine 216 determines a score of 1 for the first updated non-polar question. As another example, for the second updated non-polar question "Tom Brady and who won the Superbowl?", the scoring, threshold, and matching engine 216 determines that the answer list (Bill Belichick, Robert Gronkowski) for the question does not include the target entity (Kevin Durant) for the second updated non-polar question. Thus, the scoring, threshold, and matching engine 216 determines a score of 0 for the second updated non-polar question. As another example, for the third updated non-polar question "Who and Kevin Durant won the Superbowl?", the scoring, threshold, and matching engine 216 determines that the answer list (Stephen Curry, Russell Westbrook) for the third updated non-polar question does not include the target entity (Tom Brady) for the third updated non-polar question. Thus, the scoring, threshold, and matching engine 216 determines a score of 0 for the third updated non-polar question.

As another example, for the fourth updated non-polar question "Tom Brady and Bill Belichick won what?", the scoring, threshold, and matching engine 216 determines that the answer list (Superbowl, MVP) for the fourth updated non-polar question does not include the target entity (World Series) for the fourth updated non-polar question. Thus, the scoring, threshold, and matching engine 216 determines a score of 0 for the fourth updated non-polar question. As another example, for the fifth updated non-polar question "Tom Brady and who won the World Series?", the scoring, threshold, and matching engine 216 determines that the top ranked answer (Bill Belichick) for the fifth updated non-polar question matches the target entity (Bill Belichick) for the fifth updated non-polar question. Thus, the scoring, threshold, and matching engine 216 determines a score of 1 for the fifth updated non-polar question. As another example, for the sixth updated non-polar question "Who and Bill Belichick won the World Series?", the scoring, threshold, and matching engine 216 determines that the second entry in the answer list (Robert Gronkowski, Tom Brady) matches the target entity (Tom Brady) for the sixth updated non-polar question. Thus, the scoring, threshold, and matching engine 216 determines a score of ½ for the sixth updated non-polar question.

As another example, for the seventh updated non-polar question "Stephen Curry and Kevin Durant won what?", the scoring, threshold, and matching engine 216 determines that the answer list (NBA championship) for the seventh updated non-polar question "Stephen Curry and Kevin Durant won what?" does not include the target entity (World Series) for the seventh updated non-polar question. Thus, the scoring, threshold, and matching engine 216 determines a score of 0 for the seventh updated non-polar question. As another example, for the eighth updated non-polar question "Stephen Curry and who won the World Series?", the scoring, threshold, and matching engine 216 determines that the top ranked answer (Kevin Durant) for the eighth updated non-polar question matches the target entity (Kevin Durant) for the eighth updated non-polar question. Thus, the scoring, threshold, and matching engine 216 determines a score of 1 for the eighth updated non-polar question. As another example, the scoring, threshold, and matching engine 216 determines for the ninth updated non-polar question "Who and Kevin Durant won the World Series?" that the top ranked answer (Stephen Curry) for the ninth updated non-polar question matches the target entity (Stephen Curry) for the ninth updated non-polar question. Thus, the scoring, threshold, and matching engine 216 determines a score of 1 for the ninth updated non-polar question.

The scoring, threshold, and matching engine 216 then determines, for each of the updated input statements 115, whether the updated input statement is correct (e.g., a substitute statement 219) by determining whether the average score for the updated non-polar questions 117 of updated input statement satisfies the threshold. For example, the scoring, threshold, and matching engine 216 may determine that the average score for the updated non-polar questions 117 for the first updated input statement is ⅓. Similarly, the scoring, threshold, and matching engine 216 may determine that the average score for the updated non-polar questions 117 for the second updated input statement is ½. Similarly, the scoring, threshold, and matching engine 216 may determine that the average score for the updated non-polar questions 117 of the third updated input statement is ⅔. The scoring, threshold, and matching engine 216 may compare the average scores to the threshold to determine whether any of the updated input statements 115 are correct. When the threshold corresponds to, for example, 80%, the scoring, threshold, and matching engine 216 determines that the average scores for the first, second, and third updated input statements do not satisfy the threshold, and thus does not determine that the first, second, and third input statements are correct. Updated input statements that are determined to be correct are substitute statements 219 for the query 101. The matching engine 116 provides any substitute statements 219 to the criteria engine 220, and provides any non-matching non-polar questions 113 to the entity replacing engine 118.

At the end of the first iteration, the criteria engine 220 determines whether a criteria is satisfied. The criteria engine 220 operates similarly to the criteria engine 120 of FIG. 1, except that the criteria engine 220 analyzes whether a number of the substitute statements 219 (as opposed to the substitute statements 119 of FIG. 1) satisfy the threshold. Returning to the example, because none of the updated input statements for the first iteration are determined to be substitute statements 219, the criteria engine 220 determines that the number (0) of substitute statements 219 is less than the particular number (e.g., 2) required to satisfy the criteria. The substitute statement sub-system 202 will therefore proceed to perform a second iteration with the updated non-polar questions (of the first iteration) whose target entity did not match the top ranked answer for the question acting as the non-matching non-polar questions 113 for the second iteration.

Thus, in the example, the substitute statement sub-system 202 performs a second iteration, in which the entity replacing engine 118 determines the fourth, fifth, sixth, seventh, and eighth updated input statements described above with reference to FIG. 1 based on the second, third, fourth, sixth, and seventh updated input statements as described above with reference to FIG. 1.

Once the updated input statements 115 for the second iteration are generated, the non-polar question engine 106 determines updated non-polar questions 117 for the second iteration for each of the updated input statements 115 of the second iteration as described above with respect to the updated non-polar questions 117 for the first iteration. For example, the non-polar question engine 106 may determine the tenth through twenty first updated non-polar questions described above with reference to FIG. 1.

Once the updated non-polar questions 117 for the second iteration are generated, the query engine 114 queries the non-polar question/answer sub-system 112 for the non-polar answers 111 for the updated non-polar questions 117 of the second iteration. The non-polar question/answer sub-system 112 provides the non-polar answers 111 to the scoring, threshold, and matching engine 216. To illustrate, for the tenth updated non-polar question "Tom Brady and Bill Belichick won what?", the non-polar question/answer sub-system 112 determines, and the matching engine 116 receives, a ranked list of "Superbowl, MVP." Similarly, in response to the eleventh updated non-polar question "Tom Brady and who won the Superbowl", the non-polar question/answer sub-system 112 determines, and the matching engine 116 receives, a list containing "Bill Belichick, Robert Gronkowski". Similarly, in response to the twelfth updated non-polar question "Who and Bill Belichick won the Superbowl?", the non-polar question/answer sub-system 112 determines, and the matching engine 116 receives, a list containing "Robert Gronkowski, Tom Brady". As another example, for the thirteenth updated non-polar question "Stephen Curry and Kevin Durant won what?", the non-polar question/answer sub-system 112 determines, and the matching engine 116 receives, a ranked list including "NBA championship". Similarly, in response to the fourteenth updated non-polar question "Stephen Curry and who won the Superbowl?", the non-polar question/answer sub-system 112 determines, and the matching engine 116 receives, a list containing "Kevin Durant". Similarly, in response to the fifteenth updated non-polar question "Who and Kevin Durant won the Superbowl?", the non-polar question/answer sub-system 112 determines, and the matching engine 116 receives, a list containing "Stephen Curry". As another example, for the sixteenth updated non-polar question "Robert Gronkowski and Bill Belichick won what?", the non-polar question/answer sub-system 112 determines, and the matching engine 116 receives, a ranked list including "Superbowl." Similarly, in response to the seventeenth updated non-polar question "Robert Gronkowski and who won the World Series", the non-polar question/answer sub-system 112 determines, and the matching engine 116 receives, a list containing "Tom Brady". Similarly, in response to the eighteenth updated non-polar question "Who and Bill Belichick won the World Series?", the non-polar question/answer sub-system 112 determines, and the matching engine 116 receives, a list containing "Robert Gronkowski, Tom Brady". As another example, for the nineteenth updated non-polar question "Stephen Curry and Kevin Durant won what?", the non-polar question/answer sub-system 112 determines, and the matching engine 116 receives, a ranked list including "NBA championship." Similarly, for the twentieth updated non-polar question "Stephen Curry and who won the NBA championship?", the non-polar question/answer sub-system 112 determines, and the matching engine 116 receives, a list containing "Kevin Durant". Similarly, for the twenty first updated non-polar question and "Who and Kevin Durant won the NBA championship?", the non-polar question/answer sub-system 112 determines, and the matching engine 116 receives, a list containing "Stephen Curry".

Once the non-polar answers 111 for the second iteration are received, the scoring, threshold, and matching engine 216 determines a score for each of the updated non-polar questions 117. To illustrate, for the tenth updated non-polar question "Tom Brady and Bill Belichick won what?", the scoring, threshold, and matching engine 216 determines that the top ranked answer (Superbowl) for the tenth updated non-polar question matches the target entity (Superbowl) for the tenth updated non-polar question. Thus, the scoring, threshold, and matching engine 216 determines a score of 1 for the tenth updated non-polar question. As another example, for the eleventh updated non-polar question "Tom Brady and who won the Superbowl?", the scoring, threshold, and matching engine 216 determines that the top ranked answer (Bill Belichick) for the question matches the target entity (Bill Belichick) for the eleventh updated non-polar question. Thus, the scoring, threshold, and matching engine 216 determines a score of 1 for the second updated non-polar question. As another example, for the twelfth updated non-polar question "Who and Bill Belichick won the Superbowl?", the scoring, threshold, and matching engine 216 determines that the second answer (Tom Brady) on the answer list (Robert Gronkowski, Tom Brady) for the twelfth updated non-polar question matches the target entity (Tom Brady) for the twelfth updated non-polar question. Thus, the scoring, threshold, and matching engine 216 determines a score of ½ for the twelfth updated non-polar question.

As another example, for the thirteenth updated non-polar question "Stephen Curry and Kevin Durant won what?", the scoring, threshold, and matching engine 216 determines that the answer list (NBA championship) for the thirteenth updated non-polar question "Stephen Curry and Kevin Durant won what?" does not include the target entity (Superbowl) for the thirteenth updated non-polar question. Thus, the scoring, threshold, and matching engine 216 determines a score of 0 for the thirteenth updated non-polar question. As another example, for the fourteenth updated non-polar question "Stephen Curry and who won the Superbowl?", the scoring, threshold, and matching engine 216 determines that the top ranked answer (Kevin Durant) for the fourteenth updated non-polar question matches the target entity (Kevin Durant) for the fourteenth updated non-polar question. Thus, the scoring, threshold, and matching engine 216 determines a score of 1 for the fourteenth updated non-polar question. As another example, the scoring, threshold, and matching engine 216 determines for the fifteenth updated non-polar question "Who and Kevin Durant won the Superbowl?" that the top ranked answer (Stephen Curry) for the fifteenth updated non-polar question matches the target entity (Stephen Curry) for the fifteenth updated non-polar question. Thus, the scoring, threshold, and matching engine 216 determines a score of 1 for the fifteenth updated non-polar question.

As another example, for the sixteenth updated non-polar question "Robert Gronkowski and Bill Belichick won what?", the scoring, threshold, and matching engine 216 determines that the answer list (Superbowl) for the sixteenth updated non-polar question does not include the target entity (World Series) for the sixteenth updated non-polar question. Thus, the scoring, threshold, and matching engine 216 determines a score of 0 for the sixteenth updated non-polar question. As another example, for the seventeenth updated non-polar question "Robert Gronkowski and who won the World Series?", the scoring, threshold, and matching engine 216 determines that the second answer in the answer list (Tom Brady, Bill Belichick) for the seventeenth updated non-polar question matches the target entity (Bill Belichick) for the seventeenth updated non-polar question. Thus, the scoring, threshold, and matching engine 216 determines a score of ½ for the seventeenth updated non-polar question. As another example, the scoring, threshold, and matching engine 216 determines for the eighteenth updated non-polar question "Who and Bill Belichick won the World Series?" that the top ranked answer (Robert Gronkowski) for the eighteenth updated non-polar question matches the target entity (Robert Gronkowski) for the eighteenth updated non-polar question. Thus, the scoring, threshold, and matching engine 216 determines a score of 1 for the eighteenth updated non-polar question.

As another example, for the nineteenth updated non-polar question "Stephen Curry and Kevin Durant won what?", the scoring, threshold, and matching engine 216 determines that the top ranked answer (NBA championship) for the nineteenth updated non-polar question matches the target entity (NBA championship) for the nineteenth updated non-polar question. Thus, the scoring, threshold, and matching engine 216 determines a score of 1 for the nineteenth updated non-polar question. As another example, for the twentieth updated non-polar question "Stephen Curry and who won the NBA championship?", the scoring, threshold, and matching engine 216 determines that the top ranked answer (Kevin Durant) for the twentieth updated non-polar question matches the target entity (Kevin Durant) for the twentieth updated non-polar question. Thus, the scoring, threshold, and matching engine 216 determines a score of 1 for the twentieth updated non-polar question. As another example, the scoring, threshold, and matching engine 216 determines for the twenty first updated non-polar question "Who and Kevin Durant won the NBA championship?" that the top ranked answer (Stephen Curry) for the twenty first updated non-polar question matches the target entity (Stephen Curry) for the twenty first updated non-polar question. Thus, the scoring, threshold, and matching engine 216 determines a score of 1 for the twenty first updated non-polar question.

The scoring, threshold, and matching engine 216 then determines whether the average score for each of the updated input statements satisfies the threshold. For example, the scoring, threshold, and matching engine 216 may determine that the average score for the updated non-polar questions of the fourth updated input statement is 2.5/3 (or 83%). Similarly, the scoring, threshold, and matching engine 216 may determine that the average score for the updated non-polar questions of the fifth updated input statement is ⅔ (66.66%). Similarly, the scoring, threshold, and matching engine 216 may determine that the average score for the updated non-polar questions of the sixth updated input statement is ½ (50%). Similarly, the scoring, threshold, and matching engine 216 may determine that the average score for the updated non-polar questions of the seventh updated input statement is 1 (100%).

The scoring, threshold, and matching engine 216 may compare the average scores to the threshold to determine whether any of the updated input statements for the second iteration are correct. When the threshold corresponds to, for example, 80%, the scoring, threshold, and matching engine 216 determines that the average scores for the fourth and seventh updated input statements satisfy the threshold, and thus determines that the fourth and seventh updated input statements are substitute statements 219.

At the end of the second iteration, the criteria engine 220 determines whether a criteria is met and controls whether another iteration is performed and/or whether the substitute statements 219 are output as described above with reference to the first iteration through the criteria engine 220. Returning to the example, because two substitute statements 219 have been determined, the criteria engine 220 determines that the number (2) of substitute statements 219 is not less than the particular number (e.g., 2) required to satisfy the criteria, and the substitute statement sub-system 202 will therefore output the substitute statements 219.

Figure 3:
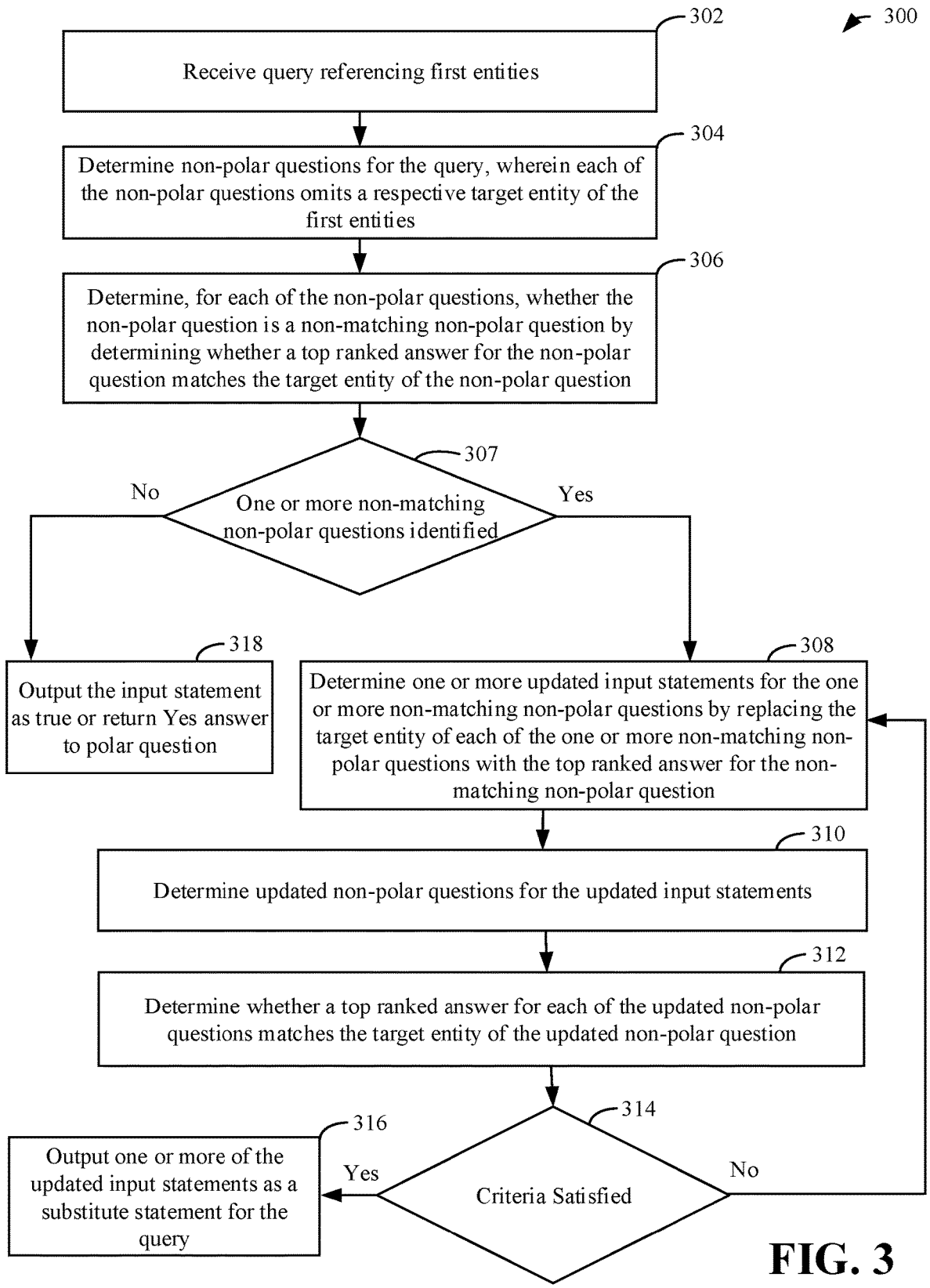
FIG. 3 is a flowchart showing an embodiment of a computer-implemented method capable of being performed, at least in part, by the system of FIG. 1.

FIG. 3 is a flowchart of a computer-implemented method 300 to determine one or more substitute statements for a query. The computer-implemented method 300 may be performed by one or more components of the system 100 of FIG. 1.

The computer-implemented method 300 includes receiving, at 302, a query referencing first entities. The query may correspond to the query 101 described above with reference to FIG. 1, and the query may be received by the substitute statement sub-system 202 of FIG. 1 from the client device 110 of FIG. 1 via the network 104 of FIG. 1.

The computer-implemented method 300 further includes determining, at 304, non-polar questions for the query. Each of the non-polar questions omits a respective target entity of the first entities. For example, the non-polar questions for the query may correspond to the non-polar questions 109 of FIG. 1, and may be determined by the non-polar question engine 106 as described above with reference to FIG. 1.

The computer-implemented method 300 further includes determining, at 306, for each of the non-polar questions, whether the non-polar question is a non-matching non-polar question by determining whether a top ranked answer for the non-polar question matches the target entity of the non-polar question. For example, the non-matching non-polar question may correspond to one of the non-matching non-polar questions 113 described above with reference to FIG. 1. Additionally, the matching engine 116 of FIG. 1 may determine and/or receive the non-polar answers 111 of FIG. 1, and may determine whether the target entities for non-polar questions 109 of FIG. 1 match the non-polar answers 111 for the non-polar questions 109 as described above with reference to FIG. 1.

The computer-implemented method 300 further includes determining, at 307, whether one or more non-matching non-polar questions are identified (e.g., at step 306). When no non-matching non-polar questions are identified, the computer-implemented method 300 includes outputting, at 318, the input statement of the query as a true statement or outputting a 'Yes' answer to the polar question of the query as described above with reference to FIG. 1.

When one or more non-matching non-polar questions are identified, the computer-implemented method 300 further includes proceeding to determine, at 308, one or more updated input statements for the one or more non-matching non-polar questions by replacing the target entity of each of the one or more non-matching non-polar questions with the top ranked answer for the non-matching non-polar question; determine, at 310, updated non-polar questions for the one or more updated input statements; and determine, at 312, whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met. For example, the one or more updated input statements may correspond to the updated input statements 115 of FIG. 1, and may be determined by the entity replacing engine 118 of FIG. 1 as described above with reference to FIG. 1. The updated non-polar questions may correspond to the updated non-polar questions 117 of FIG. 1, and may be determined by the non-polar question engine 106 of FIG. 1 as described above with reference to FIG. 1. The matching engine 116 may determine whether a top ranked answer (e.g., of the non-polar answers 111 of FIG. 1) for each of the updated non-polar questions matches the target entity of the updated non-polar question as described above with reference to FIG. 1. The criteria may correspond to the criteria described above with reference to FIG. 1, and the criteria engine 120 of FIG. 1 may determine, at 314, whether the criteria is met or satisfied as described above with reference to FIG. 1.

The computer-implemented method 300 further includes outputting, at 316, one or more of the updated input statements as a substitute statement for the query. For example, the substitute statement sub-system 102 may output the substitute statements 119 to the client device 110 of FIG. 1 via the network 104 as described above with reference to FIG. 1.

Figure 4:
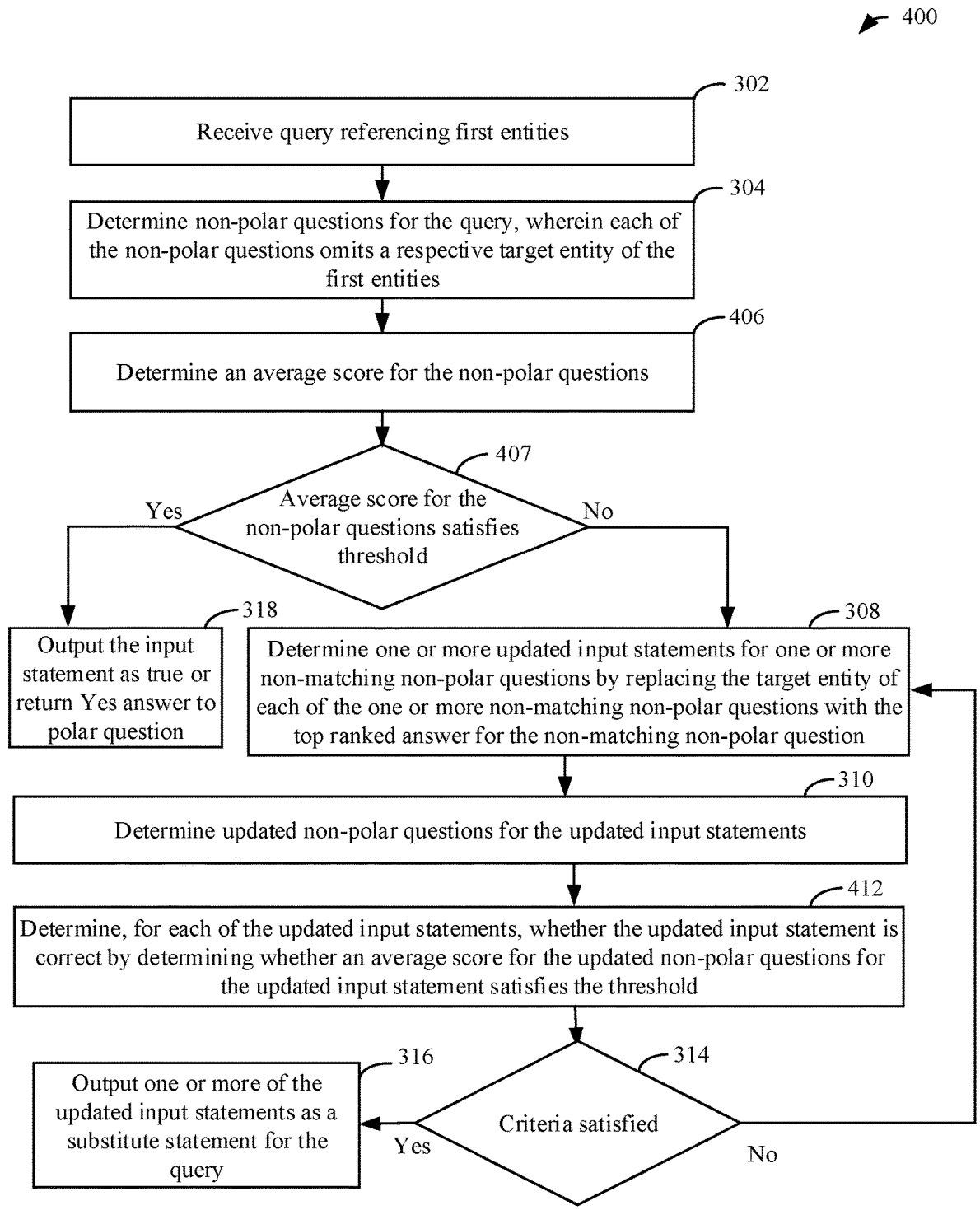
FIG. 4 is a flowchart showing an embodiment of a computer-implemented method capable of being performed, at least in part, by the system of FIG. 2.

FIG. 4 is a flowchart of a computer-implemented method 400 to determine one or more substitute statements for a query. The computer-implemented method 400 may be performed by one or more components of the system 200 of FIG. 2. Steps in the computer-implemented method 400 that are the same as steps in the computer-implemented method 300 are numbered in FIG. 4 using corresponding reference numbers of FIG. 3.

The computer-implemented method 400 includes receiving, at 302, a query referencing first entities, and determining, at 304, non-polar questions for the query, as described above with reference to FIG. 3.

The computer-implemented method 400 further includes determining, at 406, an average score for the non-polar questions. For example, the scoring, threshold, and matching engine 216 of FIG. 2 may determine an average score for the non-polar questions 109 of FIG. 2 as described above with reference to FIG. 2.

The computer-implemented method 400 further includes determining, at 407, whether the average score for the non-polar questions satisfies a threshold. For example, the scoring, threshold, and matching engine 216 of FIG. 2 may determine whether the average score for the non-polar questions 109 of FIG. 2 satisfies the threshold as described above with reference to FIG. 2. When the average scores satisfy the threshold, the computer-implemented method 400 includes outputting, at 318, the input statement of the query as a true statement or outputting a 'Yes' answer to the polar question of the query as described above with reference to FIG. 3.

When the average scores do not satisfy the threshold, the computer-implemented method 400 further includes proceeding to determine, at 308, one or more updated input statements for the one or more non-matching non-polar questions by replacing the target entity of each of the one or more non-matching non-polar questions with the top ranked answer for the non-matching non-polar question; determine, at 310, updated non-polar questions for the one or more updated input statements; and determine, at 412, for each of the updated input statements, whether the updated input statement is correct by determining whether an average score for the updated non-polar questions for the updated input statement satisfies the threshold, in an iterative or recursive manner, with one or more of the updated non-polar questions whose respective top ranked answer does not match its corresponding target entity acting as the one or more non-matching non-polar questions for the next iteration, until a criteria is met. For example, the one or more updated input statements may correspond to the updated input statements 115 of FIG. 2, and may be determined by the entity replacing engine 118 of FIG. 2 as described above with reference to FIG. 2. The updated non-polar questions may correspond to the updated non-polar questions 117 of FIG. 2, and may be determined by the non-polar question engine 106 of FIG. 2 as described above with reference to FIG. 2. The scoring, threshold, and matching engine 216 of FIG. 2 may determine whether each of the updated input statements 115 is correct (e.g., is a substitute statement 219) by determining whether an average score for the updated non-polar questions for the updated input statement satisfies a threshold as described above with reference to FIG. 2. The criteria may correspond to the criteria described above with reference to FIG. 2, and the criteria engine 220 may determine, at 314, whether the criteria is met or satisfied as described above with reference to FIG. 2.

The computer-implemented method 400 further includes outputting, at 316, one or more of the correct statements as a substitute statement for the query. For example, the substitute statement sub-system 202 may output the substitute statements 219 to the client device 110 of FIG. 2 via the network 104 as described above with reference to FIG. 2.

Figure 5:
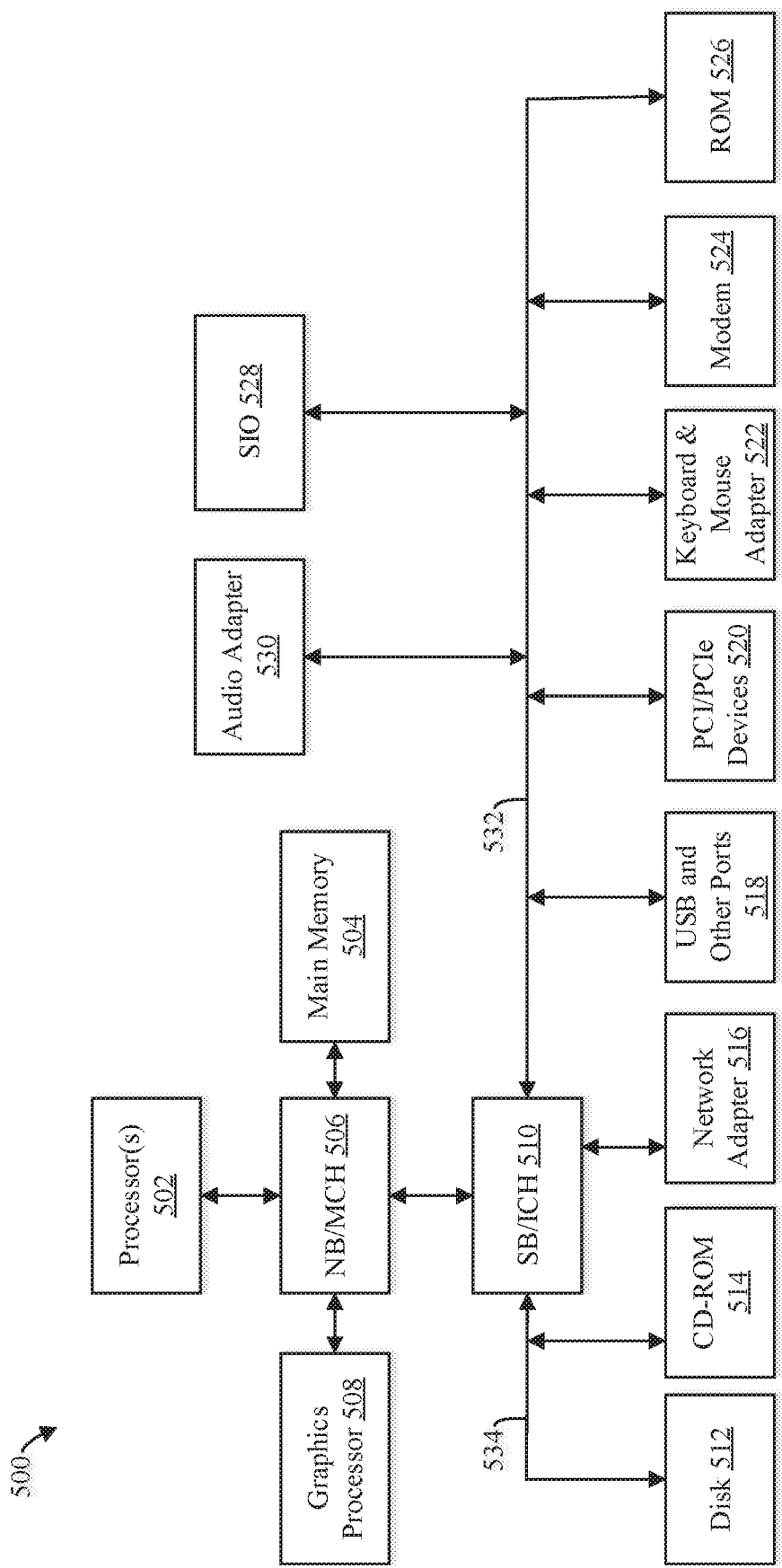
FIG. 5 shows an illustrative block diagram of an example data processing system that can be applied to implement embodiments of the present disclosure.

FIG. 5 is a block diagram of an example data processing system in which aspects of the illustrative embodiments may be implemented. Data processing system 500 is an example of a computer that can be applied to implement one or more components the system 100 of FIG. 1 (e.g., the substitute statement sub-system 102 of FIG. 1) or the system 200 of FIG. 2 (e.g., the substitute statement sub-system 202 of FIG. 2) and in which computer usable code or instructions implementing the processes for illustrative embodiments of the present disclosure may be located. In one illustrative embodiment, FIG. 5 represents a computing device that implements the one or more components of the system 100 of FIG. 1 (e.g., the substitute statement sub-system 102 of FIG. 1) or the system 200 of FIG. 2 (e.g., the substitute statement sub-system 202 of FIG. 2) augmented to include the additional mechanisms of the illustrative embodiments described hereafter.

In the depicted example, data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP).

In the depicted example, local area network (LAN) adapter 516 connects to SB/ICH 510. Audio adapter 530, keyboard and mouse adapter 522, modem 524, read only memory (ROM) 526, hard disc drive (HDD) 512, compact disc ROM (CD-ROM) drive 514, universal serial bus (USB) ports and other communication ports 518, and peripheral component interconnect (PCI) or PCI Express (PCIe) devices 520 connect to SB/ICH 510 through bus 532 and bus 534. PCI/PCIe devices may include, for example, Ethernet adapters, add-in cards, and personal computer (PC) cards for notebook computers. PCI uses a card bus controller, while PCIe does not. ROM 526 may be, for example, a flash basic input/output system (BIOS).

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. Super I/O (SIO) device 528 may be connected to SB/ICH 510.

An operating system runs on processor(s) 502. The operating system coordinates and provides control of various components within the data processing system 500 in FIG. 5. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

In some embodiments, data processing system 500 may be, for example, an IBM® eServer™ System P® computer system, running the Advanced Interactive Executive (AIX®) operating system or the LINUX® operating system. Data processing system 500 may be a symmetric multiprocessor (SMP) system including a plurality of processors 502. Alternatively, a single processor system may be employed.

Instructions for the operating system, the object-oriented programming system, and applications or programs are located on storage devices, such as HDD 512, and may be loaded into main memory 504 for execution by processor(s) 502. The processes for illustrative embodiments of the present disclosure may be performed by processor(s) 502 using computer usable program code, which may be located in a memory such as, for example, main memory 504, ROM 526, or in one or more peripheral devices 512 and 514, for example.

A bus system, such as bus 532 or bus 534 as shown in FIG. 5, may include one or more buses. The bus system may be implemented using any type of communication fabric or architecture that provides for a transfer of data between different components or devices attached to the fabric or architecture. A communication unit, such as modem 524 or network adapter 516 of FIG. 5, may include one or more devices used to transmit and receive data. A memory may be, for example, main memory 504, ROM 526, or a cache such as found in NB/MCH 506 in FIG. 5.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read only memory (EPROM) or Flash memory, a static RAM (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a query referencing first entities;
generating non-polar questions for based on the query, wherein each of the non-polar questions omits a respective target entity of the first entities;
determining, for each of the non-polar questions, whether the non-polar question is a non-matching non-polar question by determining whether a top ranked answer for the non-polar question matches the target entity of the non-polar question;
when one or more non-matching non-polar questions are identified, proceeding to determine one or more updated input statements for the one or more non-matching non-polar questions by replacing the target entity of each of the one or more non-matching non-polar questions with the top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met;
determining a confidence level, for each of the updated input statements, based on how many top ranked answers for the updated non-polar questions of the updated input statement match respective target entities of the updated non-polar questions for the updated input statement; and outputting one or more of the updated input statements as a substitute statement for the query based at least partially on the determined confidence level.

2. The computer-implemented method of claim 1, further comprising identifying the first entities in the query, wherein the non-polar questions for the query are determined based on the query and the first entities.

3. The computer-implemented method of claim 2, wherein the non-polar questions include at least three non-polar questions and the first entities include at least three entities.

4. The computer-implemented method of claim 3, wherein at least one of the updated input statements that is output as the substitute statement includes only one of the at least three entities.

5. The computer-implemented method of claim 1, further comprising determining, for each of the updated input statements, whether the updated input statement is a high confidence updated input statement based on whether top ranked answers for all of the updated non-polar questions of the updated input statement match respective target entities of the updated non-polar questions for the updated input statement.

6. The computer-implemented method of claim 5, wherein the criteria includes that a number of updated input statements identified as high-confidence updated input statements satisfies a threshold.

7. A non-transitory computer readable storage media storing instructions that, when executed by a computer, cause the computer to:
receive a query referencing first entities;
generate non-polar questions for based on the query, wherein each of the non-polar questions omits a respective target entity of the first entities;
determine, for each of the non-polar questions, whether the non-polar question is a non-matching non-polar question;
when one or more non-matching non-polar questions are identified, proceed to determine one or more updated input statements for the one or more non-matching non-polar questions by replacing the target entity of each of the one or more non-matching non-polar questions with a top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met;
determining a confidence level, for each of the updated input statements, based on how many top ranked answers for the updated non-polar questions of the updated input statement match respective target entities of the updated non-polar questions for the updated input statement; and
output one or more of the updated input statements as a substitute statement for the query based at least partially on the determined confidence level.

8. The computer readable storage media of claim 7, wherein the instructions that, when executed by the computer, cause the computer to determine, for each of the non-polar questions, whether the non-polar question is non-matching non-polar question, cause the computer to determine, for each of the non-polar questions, whether a top ranked answer for the non-polar question matches the target entity of the non-polar question.

9. The computer readable storage media of claim 7, further comprising instructions that, when executed by the computer, cause the computer to identify the first entities in the query, wherein the non-polar questions for the query are determined based on the query and the first entities.

10. The computer readable storage media of claim 9, wherein the non-polar questions include at least three non-polar questions and the first entities include at least three entities.

11. The computer readable storage media of claim 10, wherein at least one of the updated input statements that is output as the substitute statement includes only one of the at least three entities.

12. The computer readable storage media of claim 7, further comprising instructions that, when executed by the computer, cause the computer to determine, for each of the updated input statements, whether the updated input statement is a matching updated input statement based on whether top ranked answers for all of the updated non-polar questions of the updated input statement match respective target entities of the updated non-polar questions for the updated input statement.

13. The computer readable storage media of claim 12, wherein the criteria includes that a number of updated input statements identified as matching updated input statements satisfies a threshold.

14. A computer system comprising:
memory storing program instructions; and
a processor coupled to the memory and configured to execute the program instructions stored on the memory to cause the processor to:
receive a query referencing first entities;
generate non-polar questions based on the query, wherein each of the non-polar questions omits a respective target entity of the first entities;
determine, for each of the non-polar questions, whether the non-polar question is a non-matching non-polar question;
when one or more non-matching non-polar questions are identified, proceed to determine one or more updated input statements for the one or more non-matching non-polar questions by replacing the target entity of each of the one or more non-matching non-polar questions with a top ranked answer for the non-matching non-polar question, determine updated non-polar questions for the one or more updated input statements, and determine whether the top ranked answer for each of the updated non-polar questions matches the target entity of the updated non-polar question, in an iterative or recursive manner, with one or more of the updated non-polar questions whose respective top ranked answer does not match its corresponding target entity acting as the one or more non-matching non-polar questions for the next iteration, until a criteria is met;
determining a confidence level, for each of the updated input statements, based on how many top ranked answers for the updated non-polar questions of the updated input statement match respective target entities of the updated non-polar questions for the updated input statement; and
output one or more of the updated input statements as a substitute statement for the query based at least partially on the determined confidence level.

15. The computer system of claim 14, wherein the program instructions that, when executed by the processor, cause the processor to determine, for each of the non-polar questions, whether the non-polar question is a non-matching non-polar question, cause the processor to determine, for each of the non-polar questions, whether a top ranked answer for the non-polar question matches the target entity of the non-polar question.

16. The computer system of claim 14, wherein the memory stores further program instructions that, when executed by the processor, cause the processor to identify the first entities in the query, wherein the non-polar questions for the query are determined based on the query and the first entities.

17. The computer system of claim 16, wherein the non-polar questions include at least three non-polar questions and the first entities include at least three entities.

18. The computer system of claim 17, wherein at least one of the updated input statements that is output as the substitute statement includes only one of the at least three entities.

19. The computer system of claim 14, wherein the memory stores further program instructions that, when executed by the processor, cause the processor to determine, for each of the updated input statements, whether the updated input statement is a matching updated input statement based on whether top ranked answers for all of the updated non-polar questions of the updated input statement match respective target entities of the updated non-polar questions for the updated input statement.

20. The computer system of claim 19, wherein the criteria includes that a number of updated input statements identified as matching updated input statements satisfies a threshold.

\* \* \* \* \*